United States Patent [19]

Miyakawa et al.

[11] 4,447,513
[45] May 8, 1984

[54] PHOTOSENSITIVE MATERIAL FOR ELECTROPHOTOGRAPHY

[75] Inventors: Nobuhiro Miyakawa, Abiko; Teruaki Higashiguchi, Tokyo; Yumiko Sano, Ibaragi; Masatomi Funato, Sakai, all of Japan

[73] Assignee: Mita Industrial Co., Ltd., Osaka, Japan

[21] Appl. No.: 460,758

[22] Filed: Jan. 25, 1983

[30] Foreign Application Priority Data

Jan. 27, 1982 [JP] Japan .................................. 57-10214

[51] Int. Cl.³ .......................... G03G 5/06; G03G 5/02
[52] U.S. Cl. ...................................... 430/58; 260/166; 430/70; 430/72; 430/76; 430/78; 430/495
[58] Field of Search .................... 260/166; 430/58, 59, 430/70, 72, 75, 76, 78, 495, 561, 563

[56] References Cited

U.S. PATENT DOCUMENTS 3,977,870  8/1976  Rochlitz ..................... 430/58
4,279,981  7/1981  Ohta et al. .................. 430/58

Primary Examiner—Mary F. Downey
Attorney, Agent, or Firm—Sherman & Shalloway

[57] ABSTRACT

Disclosed is a photosensitive material for electrophotography, which comprises a photosensitive layer containing a tetrakis-azo pigment represented by the following formula:

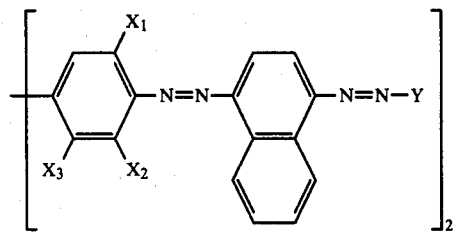

wherein $X_1$ stands for a lower alkyl group, a lower alkoxy group or a halogen atom, $X_2$ and $X_3$ stand for a lower alkyl group, a lower alkoxy group, a halogen atom or a hydrogen atom, and Y stands for a group represented by the following group:

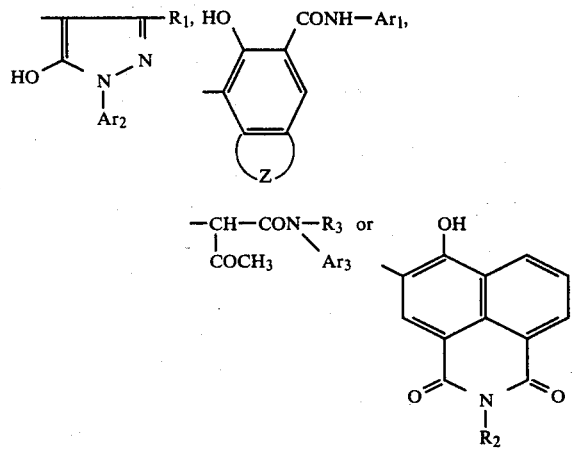

in which Z stands for an aromatic ring such as a benzene or naphthalene ring, a substitution product thereof, a hetero ring such as an indole, carbazole or benzofuran ring, or substitution product thereof, $Ar_1$ stands for an aromatic ring such as a benzene or naphthalene ring, a substitution product thereof, a hetero ring such as a dibenzofuran ring, or a substitution product thereof, $Ar_2$ and $Ar_3$ stand for an aromatic ring such as a benzene or naphthalene ring or a substitution product thereof, $R_1$ stands for a lower alkyl group, a carboxyl group or an ester thereof, and $R_2$ and $R_3$ stand for a hydrogen atom, a lower alkyl group, a phenyl group or a substitution product thereof

7 Claims 1, Drawing Figure

PHOTOSENSITIVE MATERIAL FOR ELECTROPHOTOGRAPHY

BACKGROUND OF THE INVENTION (1) Field of the Invention

The present invention relates to a photosensitive material for electrophotography, which comprises a photosensitive layer containing a tetrakis-azo pigment.

(2) Description of the Prior Art

It has been known from old that a dis-azo pigment is valuable as a photoconductive substance of a photosensitive material for electrophotography (see, for example, Japanese Patent Application Laid-Open Specification No. 37453/72). It has also been known that a tris-azo pigment derived from triphenylmethane or an azoxy-bis(azo-benzene) pigment can be used as a photoconductive pigment.

In the field of electrophotography, it is always required to expand the sensitive wavelength region and increase the copying speed. Accordingly, development of photoconductive pigments having a higher sensitivity and a broader sensitive wavelength region is always desired.

SUMMARY OF THE INVENTION

We found that a specific tetrakis-azo pigment described in detail hereinafter has a broad sensitive wavelength region and a high fastness and is very valuable as an organic photoconductive pigment. We have now completed the present invention based on this finding.

More specifically, in accordance with the present invention, there is provided a photosensitive material for electrophotography, which comprises a photosensitive layer containing a tetrakis-azo pigment represented by the following formula:

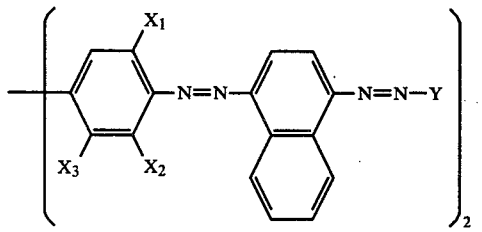

wherein $X_1$ stands for a lower alkyl group, a lower alkoxy group or a halogen atom, $X_2$ and $X_3$ stand for a lower alkyl group, a lower alkoxy group, a halogen atom or a hydrogen atom, and Y stands for a group represented by the following group:

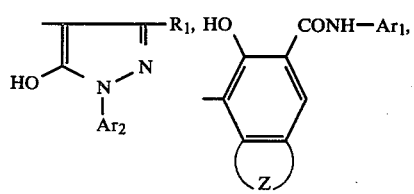

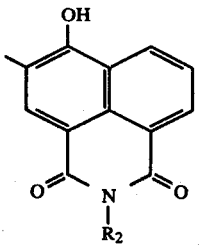

in which Z stands for an aromatic ring such as a benzene or naphthalene ring, a substitution product thereof, a hetero ring such as an indole, carbazole or benzofuran ring, or substitution product thereof, $Ar_1$ stands for an aromatic ring such as a benzene or naphthalene ring, a substitution product thereof, a hetero ring such as a dibenzofuran ring, or a substitution product thereof, $Ar_2$ and $Ar_3$ stand for an aromatic ring such as a benzene or naphthalene ring or a substitution product thereof, $R_1$ stands for a lower alkyl group, a carboxyl group or an ester thereof, and $R_2$ and $R_3$ stand for a hydrogen atom, a lower alkyl group, a phenyl group or a substitution product thereof.

DETAILED DESCRIPTION OF THE INVENTION

Figure 1:
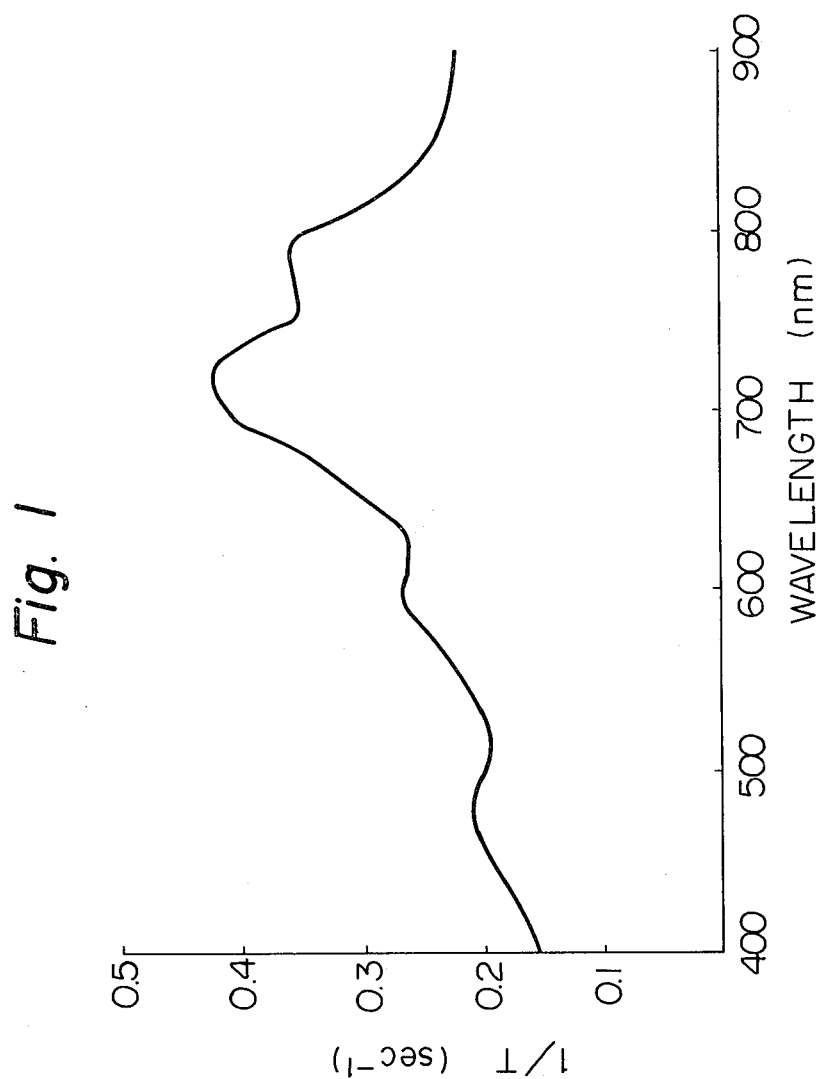
FIG. 1 is a graph showing the spectral sensitivity of the tetrakis-azo pigment that is used in the present invention.

The tetrakis-azo pigment that is used in the present invention has a structure formed by coupling a tetrazonium salt represented by the following formula:

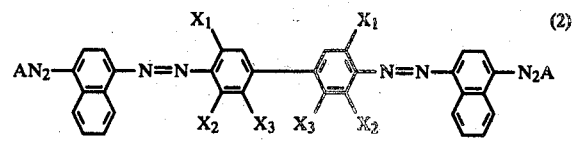

wherein $X_1$, $X_2$ and $X_3$ are as defined above, and A stands for an anion such as halaid ion or sulfuric ion, with a coupling component represented by the following formula:

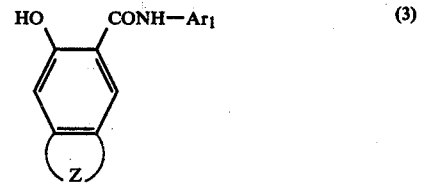

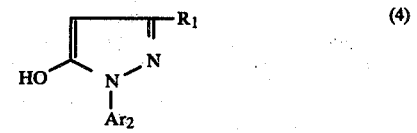

-continued
or

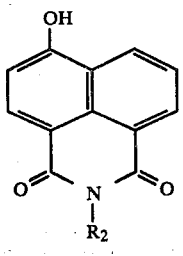

(6)

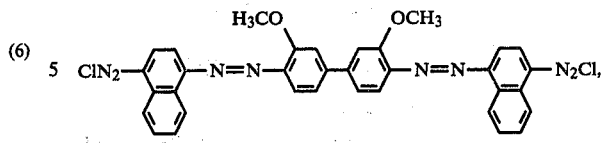

(5)

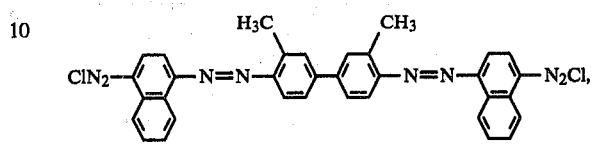

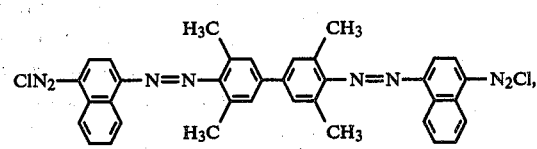

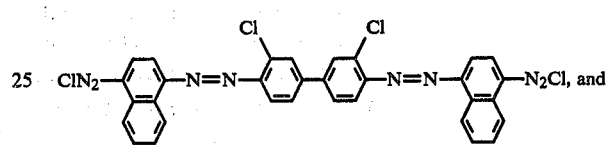

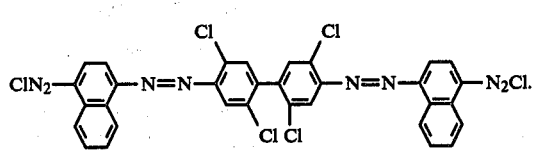

wherein Z, Ar₁, Ar₂, Ar₃, R₁, R₂ and R₃ are as defined above.

This tetrakis-azo pigment has a spectral sensitivity in the wavelength region of, for example, 400 to 900 nm as shown in FIG. 1, and is characterized in that the tetrakis-azo pigment has an excellent sensitivity to near infrared rays and infrared rays. Accordingly, a photosensitive material for electrophotography containing this tetrakis-azo pigment is valuable not only as a photosensitive material for ordinary electrophotographic reproduction or printing but also as a photosensitive material for a laser printer. Furthermore, this tetrakis-azo pigment can provide a photosensitive material having an excellent fastness to rays, discharge and ozone and a good printability.

The tetrazonium salt represented by the above general formula (2) can easily be obtained by converting a diaminobiphenyl compound represented by the following formula:

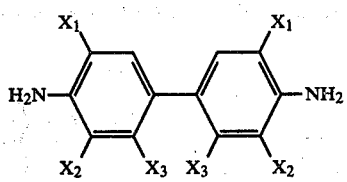

(7)

wherein X₁, X₂ and X₃ are as defined above, to a tetrazonium salt by using sodium nitrite according to customary procedures, coupling the resulting tetrazonium salt with α-naphthylamine having the following formula:

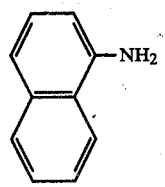

(8)

as an azo-coupling component in an appropriate solvent under an acidic condition and converting the resulting coupling product to a tetrazonium salt.

As the tetrazonium salt represented by the general formula (2), the following compounds can advantageously be used, though tetrazonium salts that can be used in the present invention are not limited to the compounds exemplified below:

As preferred examples of the azo-coupling components represented by the general formulae (3) through (6), there can be mentioned the following compounds, though azo-coupling components that can be used in the present invention are not limited to these compounds:

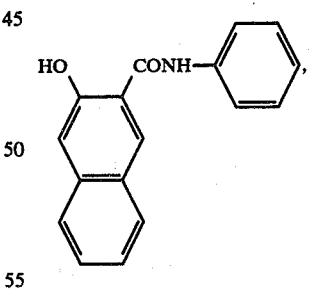

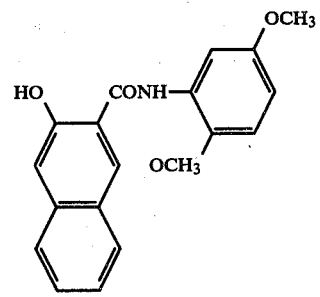

-continued
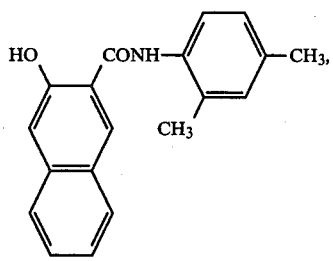
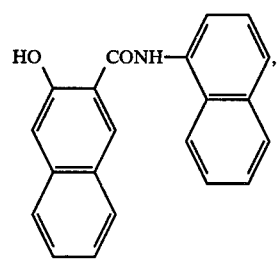
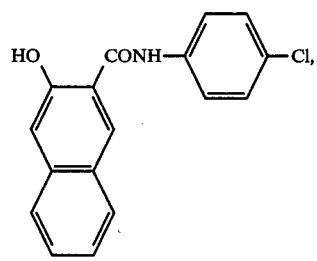
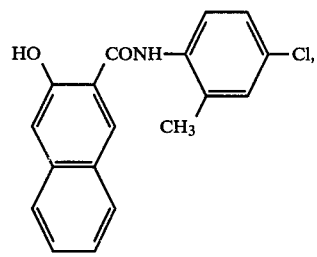
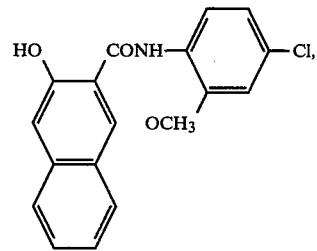
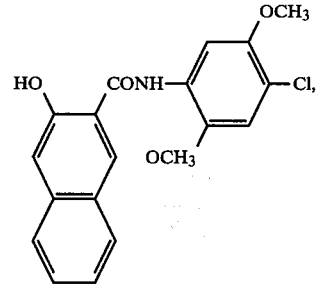
-continued
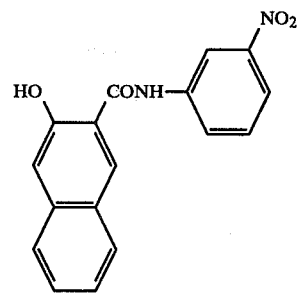
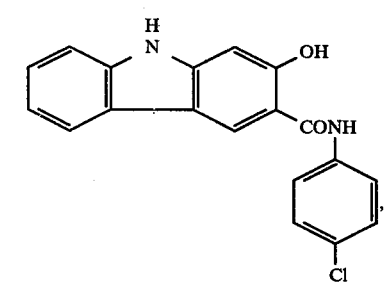
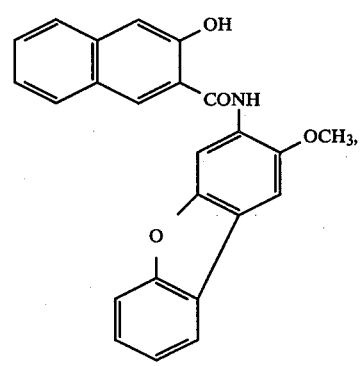
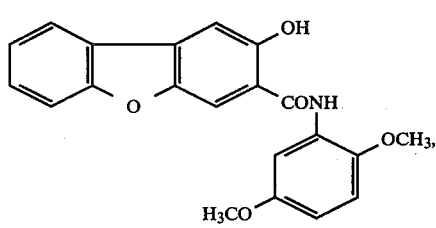
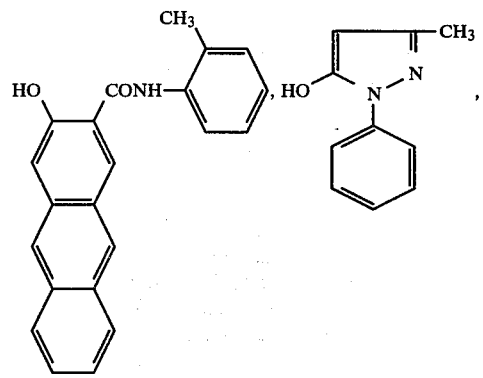

-continued

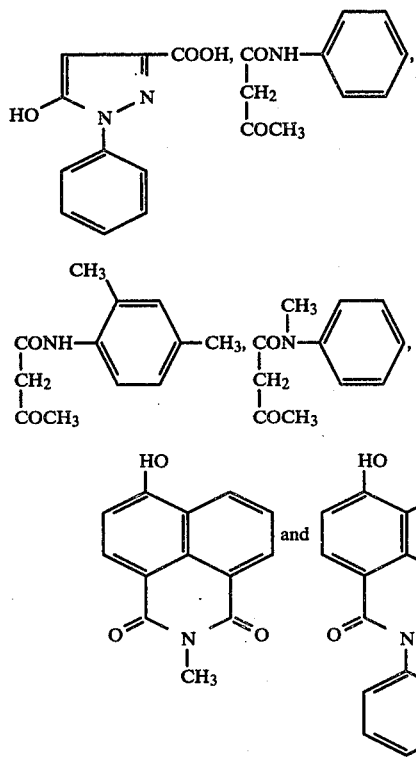

In the photosensitive material of the present invention, the tetrakis-azo pigment may be used in various modes if only the condition that the tetrakis-azo pigment should be contained in the photosensitive layer is satisfied.

For example, there may be adopted a method in which the tetrakis-azo pigment is dispersed in an electrically insulating binder medium and the resulting composition is coated as a photoconductive layer on an electroconductive substrate. In this embodiment, it is preferred that the tetrakis-azo pigment is dispersed so finely that the particle size is smaller than 3 microns, especially smaller than 1 micron. In this embodiment, as the electrically insulating binder medium, there may be used a polyester resin, an acrylic resin, a styrene resin, an epoxy resin, a polycarbonate resin, a silicone resin, an alkyd resin and a vinyl chloride/vinyl acetate copolymer.

It is preferred that the tetrakis-azo pigment be used in an amount of 5 to 100 parts by weight, especially 10 to 80 parts by weight, per 100 parts by weight of the binder.

As the electroconductive substrate, there may be used a metal substrate or a paper which has be subjected to the electrically conductive treatment in the form of a sheet or a drum. It is preferred that the amount coated of the photoconductive layer be 3 to 20 g/m$^2$, especially 5 to 10 g/m$^2$, on the dry basis.

In accordance with another embodiment of the present invention, the tetrakis-azo pigment is dispersed as a charge-generating pigment into a charge-transporting substance and the resulting dispersion is coated as a photosensitive layer on an electroconductive substrate. As the charge-transporting substance, any of known hole-transporting substances and electron-transporting substances can be used. As preferred examples the hole-transporting substance, there can be mentioned poly-N-vinylcarbazole, phenanthrene, N-ethylcarbazole, 2,5-diphenyl-1,3,4-oxadiazole, 2,5-bis-(4-diethylaminophenyl)-1,3,4-oxadiazole, bis-diethylaminophenyl-1,3,6-oxadiazole, 4,4'-bis-(diethylamino-2,2'-dimethyltriphenyl)methane, 2,4,5-tri-aminophenylimidazole, 2,5-bis-(4-diethylaminophenyl)-1,3,4-triazole, 1-phenyl-3-(4-diethylaminostyryl)-5-(4-diethylaminophenyl)-2-pyrazoline and p-diethylaminobenzaldehydo-(diphenylhydrazone). As preferred examples of the electron-transporting substance, there can be mentioned 2-nitro-9-fluorenone, 2,7-dinitro-9-fluorenone, 2,4,7-trinitro-9-fluorenone, 2,4,5,7-tetranitro-9-fluorenone, 2-nitrobenzothiophene, 2,4,8-trinitrothioxanthone, dinitroanthracene, dinitroacridine, dinitroanthraquinone and tetracyanoquinodimethane. These charge-transporting substances may be used singly or in the form of mixtures of two or more of them. Of course, a complex of an electron acceptor and an electron donor may be used so that both the hole and electron can be transported.

In the case where the charge-transporting substance is a low-molecular-weight substance, it is necessary that the charge-transporting substance should be used in the state dispersed in a binder resin such as mentioned above, and in the case where the charge-transporting substance is a polymeric substance having a binding property, in order to enhance the mechanical properties and improve the adhesion, it is preferred that a binder resin such as mentioned above be used.

In the present embodiment of the present invention, it is preferred that the tetrakis-azo pigment as the charge-generating agent be used in an amount of 1 to 30 parts by weight, especially 2 to 20 parts by weight, per 100 parts by weight of the whole photosensitive layer.

In accordance with still another embodiment of the present invention, a charge-generating layer containing the above-mentioned tetrakis-azo pigment is formed on an electroconductive substrate and a charge-transporting layer is formed on this charge-generating layer. The charge-generating layer may be formed by vacuum evaporation deposition of the tetrakis-azo pigment on the substrate or by coating and drying of a dispersion of the tetrakis-azo pigment in an appropriate organic solvent. Furthermore, the charge-generating layer may be formed by coating a dispersion of the tetrakis-azo pigment in a binder resin on the electroconductive substrate as in the above-mentioned first embodiment. The charge-transporting layer can easily be formed by coating a charge-transporting substance described in detail in the above-mentioned second embodiment. The thickness of the charge-generating layer can be changed in the range of from 0.1 micron in case of vacuum evaporation deposition to 3 microns in case of coating of the resin/pigment dispersion. On the other hand, it is preferred that the thickness of the charge-transporting layer be 5 to 30 microns.

The tetrakis-azo pigment that is used in the present invention shows an especially excellent sensitivity when it is used for a photosensitive layer of the third type, that is, a photosensitive layer of the function-separated type comprising a charge-generating layer and a charge-transporting layer.

The photosensitive material for electrophotography according to the present invention is used for the electrophotographic process in which the photosensitive layer is subjected to positive or negative corona discharge to charge the surface of the photosensitive layer and the charged surface of the photosensitive layer is subjected to imagewise light exposure to form an electrostatic latent image. Among the above-mentioned types of the photosensitive material for electrophotography according to the present invention, the first and second types are advantageously used for positive charging and the third type is used for negative charging.

The present invention will now be described in detail with reference to the following Examples that by no means limit the scope of the invention.

Synthesis Example 1

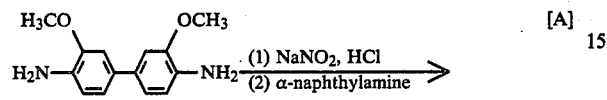

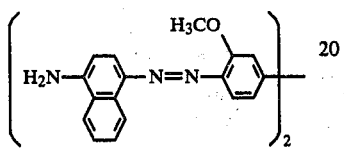

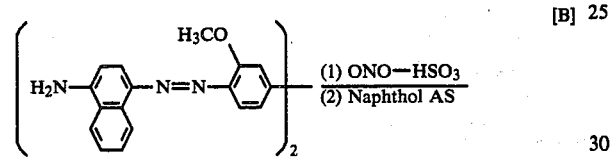

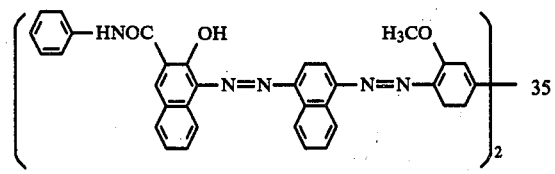

[A] In a brown beaker having an inner capacity of 200 cc, 2.44 g (0.01 mole) of dianicidine was dissolved with stirring in 40 ml of 18 N hydrochloric acid, and 4.5 ml of a 5 N aqueous solution of sodium nitrite was gradually dropped to the solution with stirring under cooling by using a separating funnel. At this step, care should be taken to prevent the temperature from rising above 10° C. After completion of the dropwise addition, the mixture was stirred for about 15 minutes, and the liquid reaction mixture was sampled and the presence of excessive nitrous acid was confirmed by means of a potassium iodide/starch paper. Excessive nitrous acid was decomposed by addition of urea. The liquid reaction mixture was subjected to filtration under suction, and a solution of 2.86 g (0.02 mole) of α-naphthylamine in 50 ml of N,N-dimethylformamide was gradually dropped to the filtrate by using a separating funnel. At this step, care should be taken to maintain the temperature at 5° to 20° C. After completion of the dropwise addition, the mixture was stirred for a while to complete the reaction. The liquid reaction mixture was poured into 500 ml of distilled water to precipitate a crystal. The crystal was recovered by filtration, washed with water and dispersed in 300 ml of acetone. The dispersion was filtered and the recovered crystal was washed with ethyl ether and vacuum-dried to obtain a reddish brown crystal [A].

Yield: 4.6 g (83.3% of the theoretical value).
IR Spectrum:

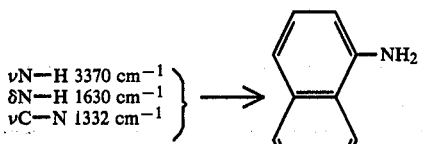

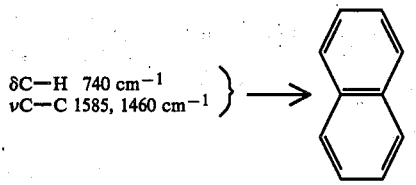

Elementary Analysis Values As $C_{34}H_{28}O_2N_6$ (molecular weight=552): Calculated Values: C=73.91%, H=5.07%, O=5.80%, N=15.22%; Found Values: C=74.10%, H=5.01%, O=5.57%, N=15.32%.

[B] In 10 ml of hot acetic acid was dissolved 0.552 g (0.001 mole) of the crystal [A], and the solution was cooled to room temperature. Then, nitrosyl hydrogensulfate (formed by dissolving 0.5 g of sodium nitrite in 3.5 ml of sulfuric acid) was added little by little to the solution with stirring while maintaining the temperature below 20° C. The mixture was stirred for 20 minutes and subjected to filtration under suction, and 1 ml of a 10 N solution of zinc chloride/hydrochloric acid was added to the filtrate. The pH value of the liquid reaction mixture was adjusted to 4 to 6 under ice cooling with a dilute aqueous solution of sodium hydroxide. In a different beaker, 0.526 g (0.002 mole) of Naphthol AS was charged, and a liquid mixture comprising 80 ml of N,N-dimethylformamide, 20 ml of a 1 N aqueous solution of sodium hydroxide and 2.5 g of sodium acetate was added thereto to form a solution. The above-mentioned liquid reaction mixture was gradually added to the solution while maintaining the temperature at 10° to 20° C. The mixture was stirred for a while and poured into 500 ml of distilled water. The purification was carried out in the same manner as described in [A] above to obtain a blackish blue tetrakis-azo pigment No. 1 of the present invention.

Yield: 0.89 g (81% of the theoretical value)
IR Spectrum:

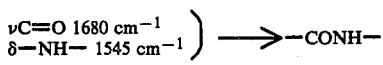

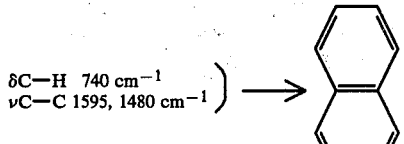

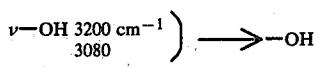

Elementary Analysis Values As $C_{68}H_{48}O_6N_{10}$ (molecular weight=1100): Calculated Values: C=74.18%, H=4.36%, O=8.73%, N=12.73%; Found Values: C=74.43%, H=4.17%, O=8.45%, N=12.95%.

The following tetrakis-azo pigments could be prepared according to the method described in Synthesis Example 1.

TABLE 1

| Structural Formula | Azo Pigment No. |
|---|---|
| | 2 |
| | 3 |
| | 4 |
| | 5 |
| | 6 |
| | 7 |
| | 8 |

TABLE 1-continued
| Structural Formula | Azo Pigment No. |
|---|---|
| 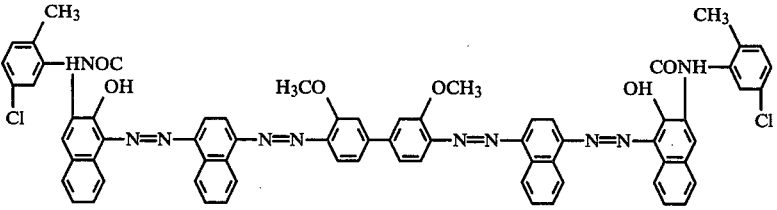 | 9 |
| 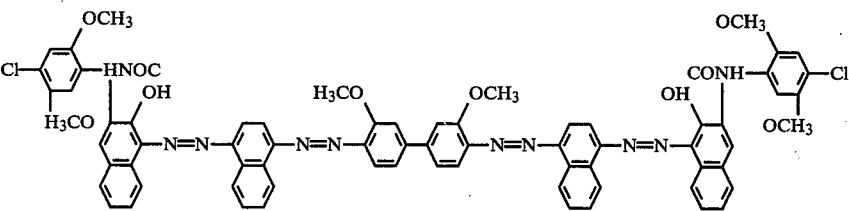 | 10 |
| 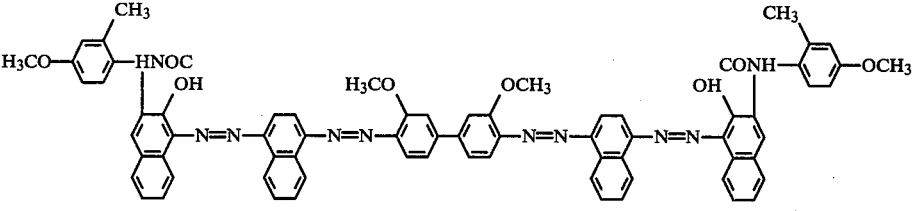 | 11 |
| 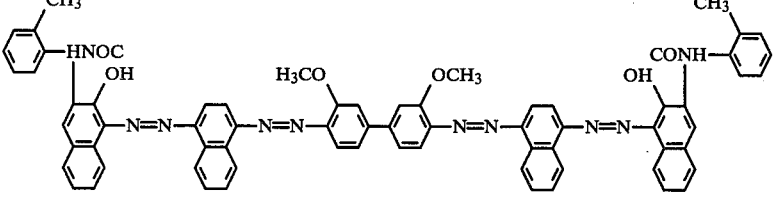 | 12 |
| 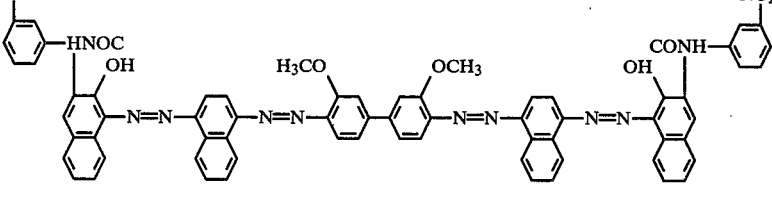 | 13 |
| 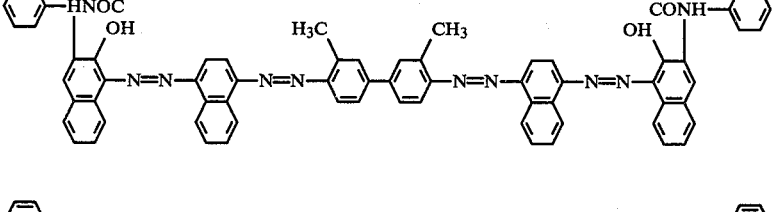 | 14 |
| 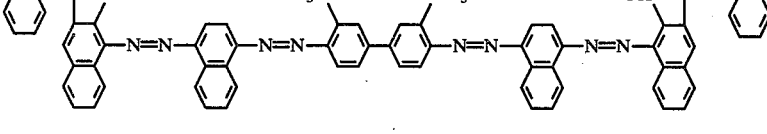 | 15 |

TABLE 1-continued

| Structural Formula | Azo Pigment No. |
|---|---|
| | 16 |
| | 17 |
| | 18 |
| | 19 |
| | 20 |
| | 21 |
| | 22 |

TABLE 1-continued

| Structural Formula | Azo Pigment No. |
|---|---|
| | 23 |
| | 24 |
| | 25 |
| | 26 |
| | 27 |
| | 28 |
| | 29 |

TABLE 1-continued
| Structural Formula | Azo Pigment No. |
|---|---|
| 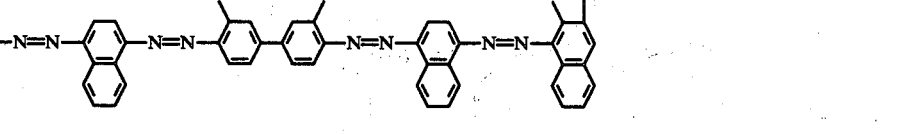 | 30 |
|  | 31 |
| 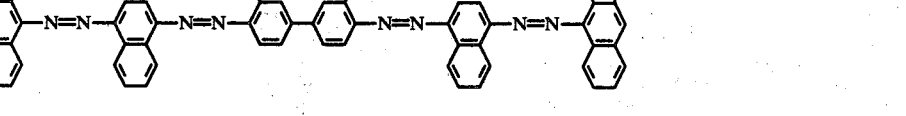 | 32 |
|  | 33 |
| 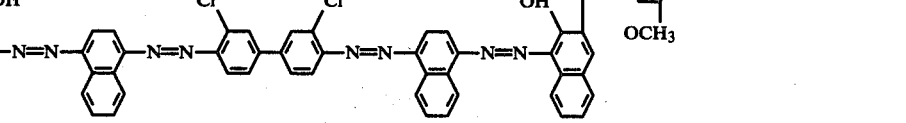 | 34 |
|  | 35 |
| 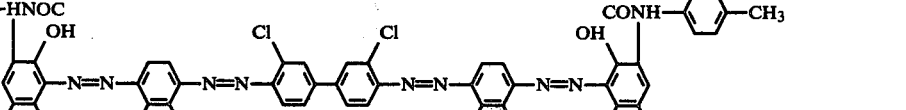 | 36 |

TABLE 1-continued

| Structural Formula | Azo Pigment No. |
|---|---|
| (structure) | 37 |
| (structure) | 38 |
| (structure) | 39 |
| (structure) | 40 |
| (structure) | 41 |
| (structure) | 42 |
| (structure) | 43 |

TABLE 1-continued

| Structural Formula | Azo Pigment No. |
|---|---|
| (structure) | 44 |
| (structure) | 45 |

EXAMPLE 1

In a ball mill, 5 parts by weight (all of "parts" given hereinafter are by weight) of the azo pigment obtained in Synthesis Example 1, 5 parts of a polyester resin (Vylon 200 supplied by Toyobo) and 150 parts of tetrahydrofuran (hereinafter referred to as "THF") were pulverized and mixed to form a coating solution.

The coating solution was coated on an aluminum foil having a thickness of 50μ by a wire bar and dried at 100° C. for 30 minutes to obtain a photosensitive material for electrophotography having a coating film thickness of 10μ.

By using a commercial surface voltage meter (Model SP-428 supplied by Kawaguchi Denki), the photosensitive material was subjected to corona discharge at +6 KV, and the initial voltage (V) was measured. The light exposure quantity necessary for reducing the surface voltage to ½ of the initial voltage (the illuminance on the surface of the sample was 20 luxes) was determined as the half-value light exposure quantity (E½, lux·sec) and used as the criterion indicating the photosensitivity. The initial voltage was +620 V and the photosensitivity was 18 lux·sec.

EXAMPLE 2

The procedures of Example 1 were repeated in the same manner except that the azo pigment No. 2, 4, 14, 19 or 33 was used instead of the azo pigment No. 1. The obtained results are shown in Table 2.

TABLE 2

| Azo Pigment No. | Initial Voltage (V) | Photosensitivity (lux.sec) |
|---|---|---|
| 2 | +680 | 17 |
| 4 | +700 | 18 |
| 14 | +590 | 15 |
| 19 | +705 | 25 |
| 33 | +630 | 20 |

EXAMPLE 3

A coating solution obtained by pulverizing and mixing 3 parts of a tetrakis-azo pigment shown in Table 3, 30 parts of 2,4,7-trinitrofluorenone, 30 parts of a polyester resin and 190 parts of THF in a ball mill was coated and dried in the same manner as described in Example 1 to obtain a photosensitive material for electrophotography. The charging characteristics of the photosensitive material were tested in the same manner as described in Example 1. The obtained results are shown in Table 3.

TABLE 3

| Azo Pigment No. | Initial Voltage (V) | Photosensitivity (lux.sec) |
|---|---|---|
| 3 | −870 | 8.7 |
| 6 | −780 | 10.1 |
| 16 | −930 | 9.2 |
| 20 | −880 | 12.0 |
| 23 | −900 | 9.7 |
| 27 | −720 | 14.0 |
| 34 | −950 | 7.8 |
| 42 | −830 | 10.8 |
| 44 | −710 | 6.8 |

EXAMPLE 4

In a ball mill, 3 parts of a tetrakis-azo pigment shown in Table 4, 30 parts of p-diethylaminobenzaldehydo-(diphenylhydrazone), 30 parts of a polyester resin and 190 parts of THF were pulverized and mixed, and a photosensitive material was prepared in the same manner as described in Example 1 by using the so-prepared coating solution. The charging characteristics of the photosensitive material were tested in the same manner as described in Example 1. The obtained results are shown in Table 4.

TABLE 4

| Azo Pigment No. | Initial Voltage (V) | Photosensitivity (lux.sec) |
|---|---|---|
| 2 | +510 | 4.8 |
| 3 | +490 | 5.0 |
| 4 | +520 | 5.8 |
| 14 | +470 | 6.5 |
| 28 | +560 | 20.3 |
| 33 | +480 | 5.1 |

As the hole-transporting substance, there could also be used poly-N-vinylcarbazole, 2,5-bis-(4-diethylaminophenyl)-1,3,4-oxadiazole and 1-phenyl-3-(4-diethylaminostyryl)-5-(4-diethylaminophenyl)-2-pyrazoline, and good results could similarly be obtained.

The sample prepared by using the azo pigment No. 2 was charged by corona discharge, and the surface of the sample was exposed to constant-energy monochromatic light having a light-receiving intensity of 3.7 μw/cm². The reciprocal number of the time T (half-value light exposure time) necessary for reducing the surface voltage to ½ was determined with respect to each wavelength as the spectral sensitivity. The obtained results are shown in FIG. 1.

From the measurement results, it was found that the sample had a spectral sensitivity to rays in the near infrared range and the infrared range.

Incidentally, the spectrophotometer capable of generating the constant-energy monochromatic light was one constructed by remodeling Model SS-50 supplied by Nippon Bunko, and the surface voltage method used was one constructed by remodeling Model SP-428 supplied by Kawaguchi Denki.

EXAMPLE 5

In a ball mill, 2 parts of a tetrakis-azo pigment shown in Table 5 was pulverized in 100 parts of THF, and the resulting dispersion was coated on an aluminum foil by a wire bar and naturally dried to form a charge-generating layer having a thickness of 0.5μ. Then, a mixed solution comprising 4.5 parts of p-diethylaminobenzaldehydo-(diphenylhydrazone), 4.5 parts of a polyester resin and 40 parts of THF was coated on the charge-generating layer and dried at 80° C. for 2 hours to form a hole-transporting layer having a thickness of 13μ.

The so-formed photosensitive material was allowed to stand in the dark place for 2 hours, and the charging characteristics were tested. The obtained results are shown in Table 5.

TABLE 5

| Azo Pigment No. | Initial Voltage (V) | Photosensitivity (lux.sec) |
|---|---|---|
| 1 | −730 | 4.6 |
| 4 | −680 | 5.3 |
| 14 | −820 | 8.0 |
| 18 | −530 | 10.3 |
| 25 | −870 | 7.1 |
| 38 | −700 | 5.1 |

As the hole-transporting substance, there could also be used polyvinylcarbazole, 2,5-bis-(4-diethylaminophenyl)-1,3,4-oxadiazole and 1-phenyl-3-(4-diethylaminostyryl)-5-(4-diethylaminophenyl)-2-pyrazoline, and good results could similarly be used.

What is claimed is:

1. A photosensitive material for electrophotography, which comprises a photosensitive layer containing a tetrakis-azo pigment represented by the following formula:

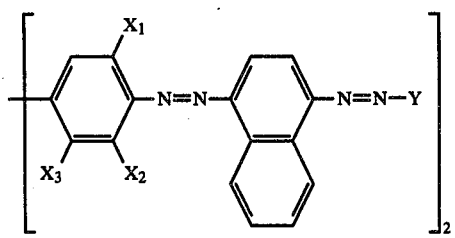

wherein $X_1$ stands for a lower alkyl group, a lower alkoxy group or a halogen atom, $X_2$ and $X_3$ stand for a lower alkyl group, a lower alkoxy group, a halogen atom or a hydrogen atom, and Y stands for a group represented by the following group:

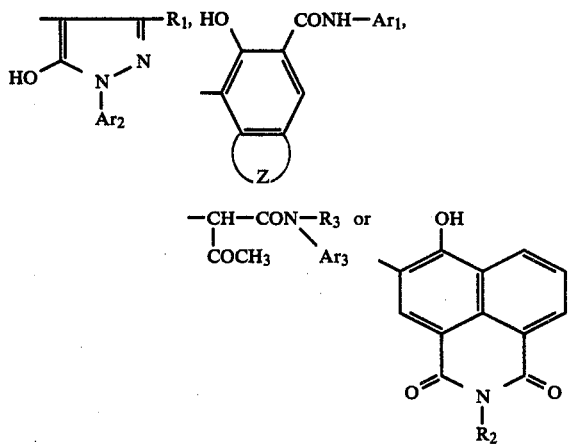

in which Z stands for benzene, naphthalene, indole, carbazole or benzofuran, or substitution product thereof, $Ar_1$ stands for benzene, naphthalene, or dibenzofuran, or substitution product thereof, $Ar_2$ and $Ar_3$ stand for benzene or naphthalene or substitution product thereof, $R_1$ stands for a lower alkyl group, a carboxyl group or an ester thereof, and $R_2$ and $R_3$ stand for a hydrogen atom, a lower alkyl group, a phenyl group or a substitution product thereof.

2. A photosensitive material as set forth in claim 1, wherein the photosensitive layer is composed of a dispersion of the tetrakis-azo pigment in an electrically insulating binder medium.

3. A photosensitive material as set forth in claim 2, wherein the tetrakis-azo pigment is present in an amount of 5 to 100 parts by weight per 100 parts by weight of the binder medium.

4. A photosensitive material as set forth in claim 1, wherein the photosensitive layer is composed of a dispersion of the tetrakis-azo pigment as a charge-generating pigment in a charge-transporting substance.

5. A photosensitive material as set forth in claim 4, wherein the tetrakis-azo pigment is present in an amount of 1 to 30 parts by weight per 100 parts by weight of the whole photosensitive layer.

6. A photosensitive material as set forth in claim 1 wherein the photosensitive layer comprises a tetrakis-azo pigment-containing charge-generating layer formed on an electroconductive substrate and a layer of a charge-transporting substance formed on the charge-generating layer.

7. A photosensitive material as set forth in claim 6, wherein the charge-generating layer has a thickness of 0.1 to 3 microns and the charge-transporting layer has a thickness of 5 to 30 microns.

* * * * *